United States Patent
Saunders et al.

(10) Patent No.: US 9,028,905 B2
(45) Date of Patent: May 12, 2015

(54) PROCESS FOR REDUCING OIL AND FAT IN COOKED FOOD WITH PEA PROTEIN

(75) Inventors: Wayne S. Saunders, Gloucester, MA (US); Stephen D. Kelleher, Ipswich, MA (US); Peter G. Williamson, Gloucester, MA (US); William R. Fielding, Hilton Head, SC (US)

(73) Assignee: Proteus Industries, Inc., Gloucester, MA (US)

(*) Notice: Subject to any disclaimer, the term of this patent is extended or adjusted under 35 U.S.C. 154(b) by 0 days.

(21) Appl. No.: 13/199,841

(22) Filed: Sep. 12, 2011

(65) Prior Publication Data

US 2012/0082767 A1 Apr. 5, 2012

Related U.S. Application Data

(60) Provisional application No. 61/404,367, filed on Oct. 4, 2010.

(51) Int. Cl.
| | | |
|---|---|---|
| A23J 3/14 | (2006.01) | |
| A21D 2/26 | (2006.01) | |
| A23L 1/01 | (2006.01) | |
| A23L 1/20 | (2006.01) | |
| A23L 1/224 | (2006.01) | |
| A23L 1/305 | (2006.01) | |
| A23L 1/307 | (2006.01) | |
| A23L 1/314 | (2006.01) | |
| A23L 1/315 | (2006.01) | |
| A23L 1/317 | (2006.01) | |
| A23L 1/325 | (2006.01) | |

(52) U.S. Cl.
CPC .............. *A21D 2/266* (2013.01); *A23L 1/0107* (2013.01); *A23L 1/2005* (2013.01); *A23L 1/224* (2013.01); *A23L 1/3055* (2013.01); *A23L 1/307* (2013.01); *A23L 1/31436* (2013.01); *A23L 1/3157* (2013.01); *A23L 1/3172* (2013.01); *A23L 1/3257* (2013.01); *A23V 2002/00* (2013.01)

(58) Field of Classification Search
USPC .................................................. 426/656, 438
See application file for complete search history.

(56) References Cited

U.S. PATENT DOCUMENTS

| | | | | |
|---|---|---|---|---|
| 3,870,801 | A | * | 3/1975 | Tombs ............................ 426/92 |
| 7,820,217 | B2 | * | 10/2010 | Kawai et al. .................. 426/291 |
| 2006/0210680 | A1 | | 9/2006 | Kelleher et al. |
| 2008/0254167 | A1 | * | 10/2008 | McMindes et al. ............. 426/72 |
| 2008/0274256 | A1 | * | 11/2008 | Ajmera ........................ 426/557 |
| 2008/0299281 | A1 | | 12/2008 | Burger |

FOREIGN PATENT DOCUMENTS

WO 9602149 A1 2/1996

OTHER PUBLICATIONS

Written Opinion of the International Searching Authority, Jan. 5, 2012.
International Search Report, Jan. 24, 2012.
Supplementary European Search Report of Dec. 19, 2013 with Preliminary Opinion.

* cited by examiner

*Primary Examiner* — Lien T Tran
(74) *Attorney, Agent, or Firm* — George A. Herbster

(57) ABSTRACT

A process for cooking a food in oil and/or fat is provided. A dry pea protein mixture or an aqueous pea protein is added to a food prior to cooking. The amount of oil and/or fat absorbed by the food during cooking is substantially reduced.

5 Claims, No Drawings

PROCESS FOR REDUCING OIL AND FAT IN COOKED FOOD WITH PEA PROTEIN

REFERENCE TO RELATED APPLICATION

This application claims the benefit of U.S. Provisional Application Ser. No. 61/404,367, filed Oct. 4, 2010 which is incorporated herein by reference.

BACKGROUND OF THE INVENTION

This invention relates to a process for controlling oil and fat content in cooked food. More particularly, this invention relates to such a process which utilizes pea protein derived from peas to control oil and fat content in food.

Prior to the present invention, foods such as meat, vegetables such as onion or potato, fish, nuts, pastry, fritters, doughnuts or the like cooked at an elevated temperature in oil and/or fat absorb the oil and/or fat. These cooking processes are commonly referred to as "deep fat frying" or as "sautéing". When the food is only partially cooked in fat and/or oil, the cooked food is referred to as "par fried". The par fried food then is subsequently fully cooked such as by baking. When cooked in this manner, the cooked food undesirably absorbs the fat or oil thereby reducing its nutritional and dietary value. A prior solution for reducing fat or oil absorption by the food during cooking is to coat the food with a substance such as pectin prior to contacting the food with the heated oil or fat. This solution is undesirable since significant oil or fat absorption by the food still occurs.

U.S. Pat. No. 7,163,707 discloses a process for reducing fat or oil absorption in cooked foods utilizing animal muscle tissue protein comprising myofibrillar and sarcoplasmic proteins. European patent application, publication number 0445369A2 discloses a process for reducing fat or oil absorption in cooked foods utilizing animal muscle tissue protein comprising myofibrillar proteins only. The use of protein derived from animal muscle tissue is undesirable for use in the food industry with vegetable foods such as potato or onion.

Accordingly, it would be desirable to provide a form of food including fish, meat, vegetables, pastry or the like which can be cooked while minimizing or preventing absorption of oil or fat by the food during cooking. In addition, it would be desirable to provide such a form of food which is not less nutritional than the original food or which is even more nutritional than the original food to be cooked.

SUMMARY OF THE INVENTION

In accordance with this invention, uncooked food to be cooked with liquid oil and/or fat, including butter is coated, injected and/or admixed with a dry protein mixture or an aqueous solution of protein mixture derived from peas.

In accordance with this invention the dry peas or aqueous pea protein is applied to the surface of the food to be cooked, is injected into the food to be cooked and/or is mixed with the food (ground, minced or thinly sliced) to be cooked such as hamburger or sausage. Alternatively, a dry pea protein composition or aqueous pea protein solution can be applied to the surface of the food or it can be mixed with the food or it can be injected into the food. The food containing the dry pea protein composition or aqueous pea protein solution, then can be cooked in liquid oil and/or fat at elevated temperature while minimizing absorption of oil and/or fat by the food. The difference in weight of fat and/or oil between food treated in accordance with this invention after being cooked in oil and/or fat compared with food without the dry pea protein composition or aqueous pea protein solution after being cooked in oil and/or fat is between about 30 and about 50%, more preferably, between about 40 and about 50% less oils and/or fat. In addition, since the amount of absorbed fat or oil utilized during cooking is substantially reduced, the amount of oil or fat needed to cook a given weight of food is correspondingly substantially reduced.

DESCRIPTION OF SPECIFIC EMBODIMENTS

In accordance with this invention, food to be cooked in oil and/or fat is coated, injected with and/or admixed with a dry protein composition, or an aqueous pea protein solution.

The pea is the leguminous vegetable with protein rich seeds that, since the 1970's, has been developed, as a protein resource for animal food, but also for human food. Suitable pea varieties include green pea, yellow pea, chick pea, black eyed pea or the like.

Pea proteins, like all proteins of leguminous plants, are constituted of three classes of proteins: globulins, albumins and "insoluble" proteins.

In a typical pea protein composition, the soluble proteins of the pea (i.e., 85% of the total proteins) group together:
- the globulins (legumins, vicilins and concivilins) which are the main storage proteins of the plant, and
- the albumins, which consist of molecules that have a functional role in the seed (predominantly the albumins PA1 and PA2).

A minor class, representing 15% of the seed proteins, consists of the insoluble proteins. This fraction is rarely taken into account in the literature due to the difficulties encountered in analyzing.

The first class of soluble proteins are the globulins, which are soluble in saline aqueous solutions and represent from 65 to 80% of the pea proteins.

They include two major proteins (legumin and vicilin) and a third which is present in a smaller amount (convicilin).

The vicilin/legumin ratio ranges from about 0.5 to 1.7 with a mean of about 1.1.

The globulins contain a high amount of arginine, aspartic acid and glutamic acid.

The legumes are hexametric proteins of 360 to 410 kDa composed of 6 double stranded subunits of 60 kDda.

The vicilins are tumeric proteins having a mass ranging from 150 to 200 kDa.

The convicilins have a tetrameric structure and their constitutive polypeptides have a mass of about 74 kDa. The final form of the protein has a mass of approximately 280 kDa.

The convicilins have a tetrameric structure and their constitutive polypeptides have a mass of approximately 74 kDa. The final form of the protein has a mass of approximately 280 kDa.

The second class of soluble proteins are the albumins, which are proteins with a low molecular mass that are soluble in water.

The albumins generally represent from 20% to 35% of the extractable proteins of the cotyledon and include most of the enzymatic and metabolic proteins (approximately 100 different proteins are grouped together in this family).

The albumins are rich in sulfur-containing amino acids and in lysine.

The two predominant albumins (PA1 and PA2) of mass 8 to 10 kDa and of mass 22 to 26 kDa, represent 34% of the total albumin fraction (each approximately 17%).

Their amino acid composition is more balanced compared with the amino acids of the globulins, hence the fact that the albumins have a better nutritional quality.

The other biologically active proteins classified among the albumins are: lipoxygenases (catalysts of alkene and in particular fatty acid oxidation), lectins (due to their ability to agglutinate carbohydrate molecules) and protease inhibitors.

In the pea, the most abundant protease inhibitors are the serine protease inhibitors, and more particularly the tryptic inhibitors. They are proteins of low molecular mass (approximately 16 kDa), rich in cystene that is involved in many disulfide bridges.

These inhibitors are proteins or polypeptides which bind specifically and stably to protcolytic enzymes and prevent them from functioning. They therefore reduce the nutritional value of foods.

The quality of the pea protein compositions, sought after for their applications in human and animal foods, is based on the functional properties of the proteins constituting the compositions taken individually.

These functional properties are their ability to bind to water, their foaming, dispersing, gelling and emulsifying capacity, their solubility and their thermostability.

The methods of prepratation of pea protein conventionally result in the production of "pea protein concentrates" or of "pea protein isolates", when the extraction process does not stop at the preparation of only the flour (cf. the review by J. Guegueen of 1983 in *Proceedings of European congress on plant proteins for human food* (3-4) pp. 267-304).

The pea protein concentrates and isolates are defined in the review by J. Geuguen from the point of view of their protein content:

The pea protein concentrates are described as having a total protein content of 60% to 75% on a dry weight basis, and the pea protein isolates are described as having a total protein content of 90% to 95% on a dry weight basis, the % being expressed as content of nitrogen Nx6.25 (cf. the review by M. Soral-Smietana et al. in *Polish Journal of Food and Nutrition Sciences,* 1998, vol. 7/48 No. 2, pp. 193-200).

Two processes are conventionally used for extracting pea protein isolates and concentrates: the wet process and the dry process.

The use of the wet process (by alkaline extraction and acid precipitation or ultrafiltration) for extracting pea proteins is recommended by specialists in the field only for obtaining protein isolates.

In fact, the small amount of soluble carbohydrates does not allow the use of the wet process for obtaining pea protein concentrates.

These processes for obtaining pea protein isolates are often preferred since they produce compositions containing fewer antinutritional factors.

The use of the dry process, i.e., air classification processes, makes it possible to obtain pea protein concentrates.

Protein compositions are then obtained which behave differently, in particular in terms of their water-solubility as a function on pH.

In fact, the water-solubility profile of the pea protein isolates and concentrates (albumins like globulins) is dependent of the pH of the aqueous solution, given the values of their respective isoelectric pHs (or pHis).

For example, pea protein isolates conventionally exhibit excellent solubility at alkaline pH and in acidic pH ranges, of from 2 to 3.

The lowest solubility is obtained in pH regions close to the isoelectric pH of the proteins constituting the isolates, i.e., pH regions ranging from 4 to 6.

Processes for obtaining pea protein compositions are disclosed, for example, in U.S. patent application number 2008/0226810A1, published Sep. 18, 2008, which is incorporated herein by reference. Other known conventional processes can be utilized to obtain pea protein compositions useful for this invention.

The dry pea protein composition or the aqueous pea protein solution then is coated or injected into and/or admixed with the uncooked food. Injection can be effected such as with a syringe, by vacuum tumbling or by soaking the food in a pea protein solutioin. The dry pea protein composition or aqueous protein solution can be applied alone or in admixture with conventional food or nutritive additives such as breading or batter coatings, spice dry rubs, cracker meal, corn meal or the like. The dry pea composition or the aqueous pea protein solution can be coated by immersion tumbling the uncooked food in the solution or in a marinade containing the aqueous protein solution in a container or tumbling or vacuum tumbling apparatus. The dry pea protein mixture, or aqueous pea protein solution also can contain flavorants such as salt, butter flavor or garlic flavor or the like.

The term "a surface" as used herein is a surface of uncooked food which is positioned 90 degrees from an adjacent surface or surfaces of the uncooked food. In addition, the term "a surface" can comprise the connecting surface connecting two adjacent surfaces positioned 90 degrees from each other. Preferably, the entire surface of the uncooked food is coated with dry pea protein composition or aqueous pea protein solution. The uncooked food containing the pea protein then can be cooked at elevated temperature in oil and/or fat while substantially preventing absorption of oil and/or fat by the food being cooked.

In one aspect of this invention, particulate food such as ground meat or fish, e.g. hamburger, or a food mixture such as a pastry for doughnuts is mixed with the dry pea protein composition or aqueous pea protein solution at a weight ratio usually comprising about 0.03 to about 18% weight of the protein mixture based on the weight of the uncooked food, preferably between about 0.5 and 10% weight based on the weight of uncooked food and most preferably comprising between about 0.5 to about 7% weight based on the weight of the uncooked food. In addition, the aqueous pea protein solution can be added to the food in the same ratios based on the weight of uncooked food. When the dry pea protein composition or aqueous pea protein solution is applied to at least one surface of the food, the amount of the pea protein added is the same weight ratio as set forth above when mixed with uncooked food. When utilizing less than about 0.03% weight dry pea protein or aqueous pea protein prevention of oil and/or fat absorption is not observed. When utilizing greater than about 15% weight pea protein, the uncooked food can become undesirably hard.

Suitable oils and/or fats, including hydrogenated or non-hydrogenated oils which can be utilized to effect cooking of uncooked food are those conventionally used in cooking including lard, peanut oil, corn oil, vegetable oil, canola oil, olive oil, palm oil, coconut oil, sesame oil, sunflower oil, butter, mixtures thereof or the like.

The uncooked food which is modified in accordance with this invention comprises meat, poultry and fish, including shell fish, vegetables, such as potato or onion, tempura; nuts, mushrooms, flour based foods such as batter compositions, pastry compositions, chicken or the like. Representative suitable fish include deboned flounder, sole, haddock, cod, sea bass, salmon, tuna, trout or the like. Representative suitable shell fish include shelled shrimp, crabmeat, crayfish, lobster, scallops, oysters, or shrimp in the shell or the like. Representative suitable meats include ham, beef, lamb, pork, venison, veal, buffalo or the like; poultry such as chicken, mechanically deboned poultry meat, turkey, duck, a game bird or goose or the like either in fillet form or in ground form such as hamburg. The meats can include the bone of the animal when the bone does not adversely affect the edibility of the meat such as spare ribs, lamb chops or pork chops. In addition, processed meat products which include animal muscle tissue such as a sausage composition, a hot dog composition, emulsified product or the like can be coated, injected or mixed with the dry pea protein composition or the aqueous pea protein solution or a combination of these addition methods. Sausage and hot dog compositions include ground meat or fish, herbs such as sage, spices, sugar, pepper, salt and fillers such as dairy products as is well known in the art. Representative vegetables include potato, carrot, cauliflower, onion, corn or the like. Additional foods include mushroom, nuts, batter compositions such as those comprising flour, egg and milk which can include additional food such as cornmeal, cracker meal or dusting meals.

The food containing the dry pea protein composition, aqueous pea protein solution then can be cooked with oil and/or fat in a conventional manner such as by deep fat frying, pan frying, or the like. It has been found that the uncooked food provided in accordance with this invention contains between about 30% and about 50%, preferably between about 40% and about 50% less oil and/or fat by weight as compared to the same uncooked food free of the protein of this invention. The amount of fat or oil needed to cook a given weight of a given type of food also is correspondingly reduced.

The following examples illustrate the present invention and are not intended to limit the same:

Example I

This example illustrates that the process of this invention produced a fried onion ring product having a substantially lower fat content and a higher moisture content as compared with conventionally prepared fried onion rings.

Yellow pea protein powder was obtained from Cosucra Group Warcoing of Warcoing, Belgium. Three 2 Brix aqueous solutions were prepared from yellow pea protein.

An acidic pea solution was prepared by mixing the yellow pea powder with water to produce a solution having a pH of 8.1. Phosphoric acid was then added to this solution to produce an acidic pea protein solution having a pH of 2.0.

A basic pea solution was prepared by mixing the yellow pea powder with water to produce a solution having a pH of 8.1. Sodium hydroxide was then added to this solution to produce a basic pea solution having a pH of 9.0.

An essentially neutral pea solution was prepared by adding the pea protein powder to water to produce a neutral pea solution having a pH of 8.1.

Onion rings were made by slicing fresh white onion. The onions were then breaded and battered in conventional breading and batter compositions. The breaded and battered onion rings were then dipped separately in one of the acidic pea protein solution, the basic pea protein solution or the neutral pea protein solution prepared as described above. Control onion rings were breaded and battered but not contacted with a pea protein solution.

Each sample of onion rings was deep fat fried in canola oil for 30 seconds at 365° F.

Each fried sample was analyzed for fat and moisture content with the results set forth in Table I.

TABLE I

| | Onion Rings | | | | |
|---|---|---|---|---|---|
| Sample | | Fat % | Change vs. Control | Moisture % | Change vs. Control |
| 1 | Control | 16.36 | | 55.87 | |
| 2 | Pea Protein 2.8 pH 2 Brix | 9.41 | −42.48% | 60.20 | 7.75% |
| 3 | Pea Protein Neutral & H2O | 9.47 | −42.11% | 62.07 | 11.10% |
| 4 | Pea Protein 9.0 pH 2 Brix | 9.49 | −41.99% | 62.00 | 10.97% |

In Table I, the values shown for fat and moisture are wt % based on the weight of the cooked onion ring product. As shown in Table I, each of the fried onion ring products containing pea protein contained at least 40% less fat than the control sample. In addition, the moisture content of the onion rings was at least 7.75 wt % greater than the control.

Example 2

Pisane C 9 pea isolate was obtained from A and B Ingredients, Fairfield, N.J. and Cosucra Groupe, Warcoing SA, Belgium and diluted with cold water to form a 2% solution. The solution was adjusted to pH 2.8 using 2N HCl and to pH 8.0 using 2N sodium hydroxide. The third sample was unadjusted and remained at pH 7.4. Fresh un-marinaded chicken tenders were battered and breaded using systems from Newly Wed Foods, Chicago, Ill. The breaded tenders were dipped for 1 second in the three separate pea protein solutions and immediately placed into hot soybean oil in a fryer at 375 F for 30 seconds. The controls were not dipped in any solution prior to the frying step. Fried products were placed on stainless steel trays to cool and subsequently placed in a freezer.

Results from fat and moisture are shown in Table 2.

TABLE 2

| Fat and Moisture of chicken tenders dipped in pea protein prior to frying | | |
|---|---|---|
| Sample | Fat (%) | Moisture (%) |
| Control | 7.78 | 58.82 |
| Pea Protein pH 2.8 | 5.08 | 64.05 |
| Pea Protein pH 7.4 | 4.93 | 64.64 |
| Pea Protein pH 8.0 | 5.27 | 64.65 |

Samples dipped in a pea protein solution at pH 2.8 were shown to have a 34.7% reduction in fat and an 8.89% increase in moisture. For the pea protein solution at pH 7.4 there was a 36.6% reduction in fat and a 9.89% increase in moisture. The alkaline sample of pea protein at pH 8.0 the fat reduction was 32.3%, with an increase in moisture of 9.91%.

The invention claimed is:

1. A process for reducing absorption of fat and/or oil into uncooked food during cooking of the food with a fat and/or oil which comprises:
   (a) preparing an acidic pea protein solution by mixing a pea protein powder with water to produce a solution, and adding phosphoric acid to the solution to produce said acidic pea protein solution having a pH of 2.0, (b) adding to a surface of said uncooked food between 0.03% and 15% by weight of said acidic pea protein solution, thereby forming a pea protein-added uncooked food, and (c) frying said pea protein-added uncooked food in an oil and/or fat whereby the protein blocks a percentage of fat from transferring to the cooked food and a percentage of moisture from transferring from the food during said cooking, wherein the percentage of fat blocked from transferring to the cooked food is between 30% and 50% as compared to fat blocked from transferring to food cooked without the protein solution.

2. A process for reducing absorption of fat and/or oil into uncooked food during cooking of the food with a fat and/or oil which comprises:

(a) preparing a basic pea protein solution by mixing a pea protein powder with water to produce a solution, and adding sodium hydroxide to the solution to produce said basic pea protein solution with a pH of 9.0, (b) adding to a surface of said uncooked food between 0.03% and 15% by weight of said basic pea protein solution, thereby forming a pea protein-added uncooked food, and (c) frying the pea protein-added uncooked food in an oil and/or fat whereby the protein blocks a percentage of fat from transferring to the cooked food and a percentage of moisture from transferring from the food during said cooking, wherein the percentage of fat blocked from transferring to the cooked food is between 30% and 50% as compared to fat blocked from transferring to food cooked without the protein solution.

3. A process for reducing absorption of fat and/or oil into uncooked food during cooking of the food with a fat and/or oil which comprises:

(a) preparing an acidic pea protein solution by mixing a pea protein powder with water to produce a solution, and adding an acid to the solution to produce said acidic pea protein solution having a pH of 2.0, (b) adding to a surface of said uncooked food between 0.03% and 15% by weight of said acidic pea protein solution, thereby forming a pea protein-added uncooked food, and (c) frying said pea protein-added uncooked food in an oil and/or fat whereby the protein blocks a percentage of fat from transferring to the cooked food and a percentage of moisture from transferring from the food during said cooking, wherein the percentage of fat blocked from transferring to the cooked food is between 30% and 50% as compared to fat blocked from transferring to food cooked without the protein solution.

4. A process for reducing absorption of fat and/or oil into uncooked food during cooking of the food with a fat and/or oil which comprises:

(a) preparing an acidic pea protein solution by mixing a pea protein powder with water to produce a solution, and adding an acid to the solution to produce said acidic pea protein solution having a pH of 2.8, (b) adding to a surface of said uncooked food between 0.03% and 15% by weight of said acidic pea protein solution, thereby forming a pea protein-added uncooked food, and (c) frying said pea protein-added uncooked food in an oil and/or fat whereby the protein blocks a percentage of fat from transferring to the cooked food and a percentage of moisture from transferring from the food during said cooking, wherein the percentage of fat blocked from transferring to the cooked food is between 30% and 50% as compared to fat blocked from transferring to food cooked without the protein solution.

5. A process for reducing absorption of fat and/or oil into uncooked food during cooking of the food with a fat and/or oil which comprises:

(a) preparing an acidic pea protein solution by mixing a pea protein powder with water to produce a solution, and adding hydrochloric acid to the solution to produce said acidic pea protein solution having a pH of 2.8, (b) adding to a surface of said uncooked food between 0.03% and 15% by weight of said acidic pea protein solution, thereby forming a pea protein-added uncooked food, and (c) frying said pea protein-added uncooked food in an oil and/or fat whereby the protein blocks a percentage of fat from transferring to the cooked food and a percentage of moisture from transferring from the food during said cooking, wherein the percentage of fat blocked from transferring to the cooked food is between 30% and 50% as compared to fat blocked from transferring to food cooked without the protein solution.

\* \* \* \* \*